United States Patent [19]

Wang

[11] Patent Number: 5,031,429
[45] Date of Patent: Jul. 16, 1991

[54] STEERING WHEEL LOCKING DEVICE

[76] Inventor: Mao-Hsiang Wang, 127-2, Neichiao Li, Paiho Town 73214, Tainan Hsien, Taiwan

[21] Appl. No.: 608,697
[22] Filed: Nov. 5, 1990
[51] Int. Cl.⁵ .............................................. B60R 25/02
[52] U.S. Cl. ........................................ 70/209; 74/552
[58] Field of Search ................ 70/209, 207, 225, 226; 74/552

[56] References Cited

U.S. PATENT DOCUMENTS 3,462,982  8/1969  Moore .................................. 70/209
4,887,443 12/1989  Wang .................................. 70/209

Primary Examiner—Robert L. Wolfe
Attorney, Agent, or Firm—Morton J. Rosenberg; David I. Klein

[57] ABSTRACT

An anti-theft steering wheel locking device which appearance and function are all the same with the one that in the market but has an anti-turning cylindric member hidding either underneath, on top of or in the steering wheel which is able to be pulled out and locked at fixed position when parking to prevent unauthorized driving the vehicle. When driving the car, driver only needs to unlock the locking device with a legal key then pushes the cylindric member back into a tube which is located in a trough and the steering wheel at this moment is able to turn freely without any disturbance. This device, furthermore, takes no extra space.

3 Claims, 9 Drawing Sheets

STEERING WHEEL LOCKING DEVICE

PRIOR ART

The automobile steering wheel locks presently on the market are generally three types described as follows:

(1) The steering wheel is locked when the ignition key is removed. A lock pin sticks into or through the steering wheel axle to prevent the steering wheel from turning.

(2) The type showed in FIG. 6 is an expandable hook in device which one end attaches to the steering wheel and the other end attaches to either the brake pedal or accelerator.

(3) The steering lock shown in FIG. 7 is a hooking device that is two hooks to hook the steering wheel and has an extended solid bar member long enough in length to prevent the wheel from being turned.

BACKGROUND OF THE INVENTION

Though the steering wheel locks described above are essentially anti-thief device, they have weakness when people uses that can easily be exploited. For example, the trough for the lock pin to stick into is shallow and the locking mechanism can easily be overcome by force. The locking devices shown in FIGS. 6 and 7, can quickly be removed by using either a bolt cutter or a hacksaw.

Steering wheel is the master of an automobile and can certainly not be done with any other abnormal modified which means that its basic function—turning freely must be kept. Normally a driver will hold the steering wheel at the position of left hand at 10 o'clock and right hand at 2 o'clock positions and therefore, it is not adequat to make any changes on these two places. The rib of the steering wheel is to connect the axle and the steering wheel together in addition to strengthen its tension.

The inventor has therefore designed a steering wheel locking device which has an integrally formed trough located underneath a rib of the steering wheel that stores a tube and tubular member. This mechanisms forms a strong tamper proof locking device which is safely concealed.

SUMMARY OF THE DRAWINGS

It is the primary object of the present invention to provide a steering wheel locking device with a trough integrally formed within the steering wheel which stores a tubular member and is easy to operate.

It is another object of the present invention to provide a steering wheel locking device which uses no hook and therefore has no such problem that the steering wheel may be cut or the hook may be bent.

It is a further object of the present invention to provide a steering wheel locking device which is hidden in the steering wheel and therefore will not bother the operation of the steering wheel.

BRIEF DESCRIPTION OF THE DRAWINGS

Figure 1:
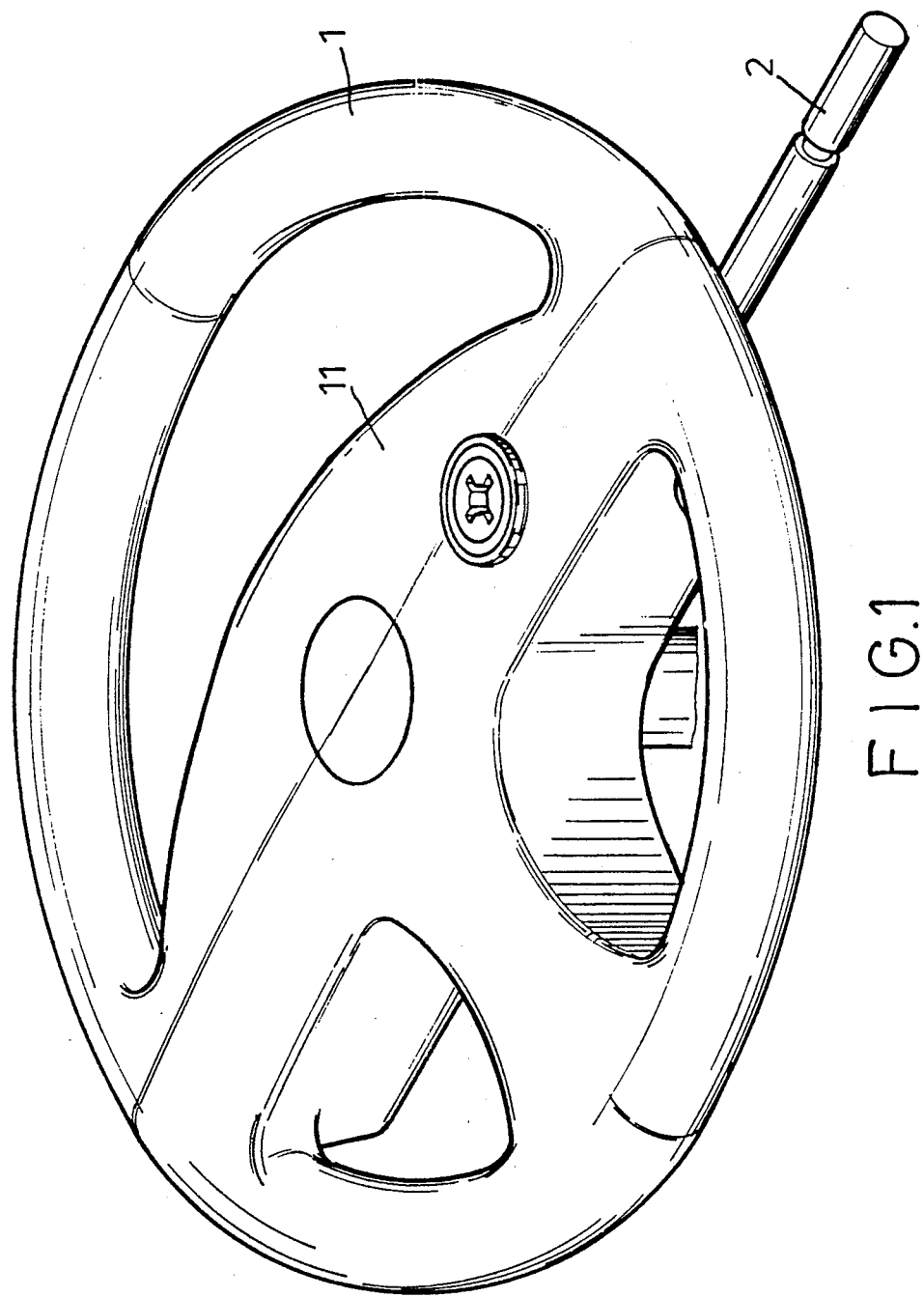
Figure 2:
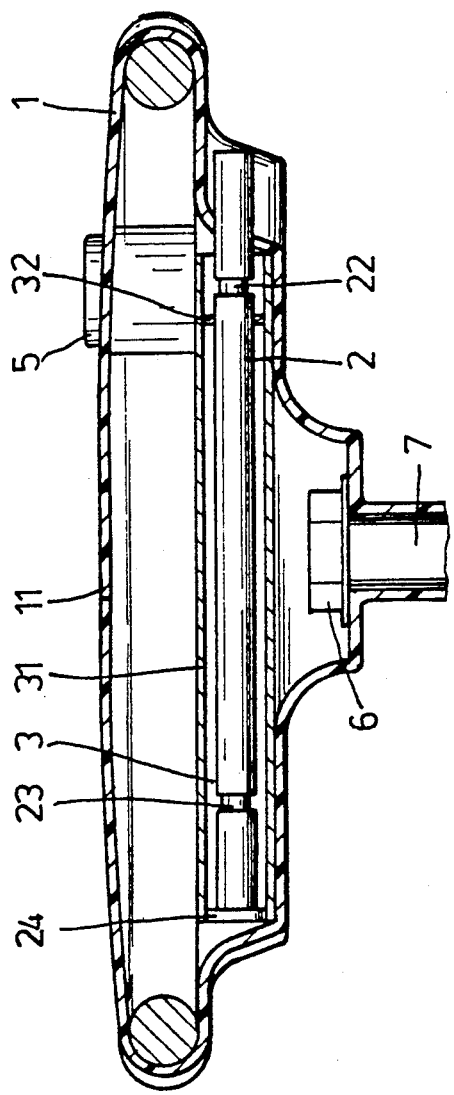
Figure 3A:
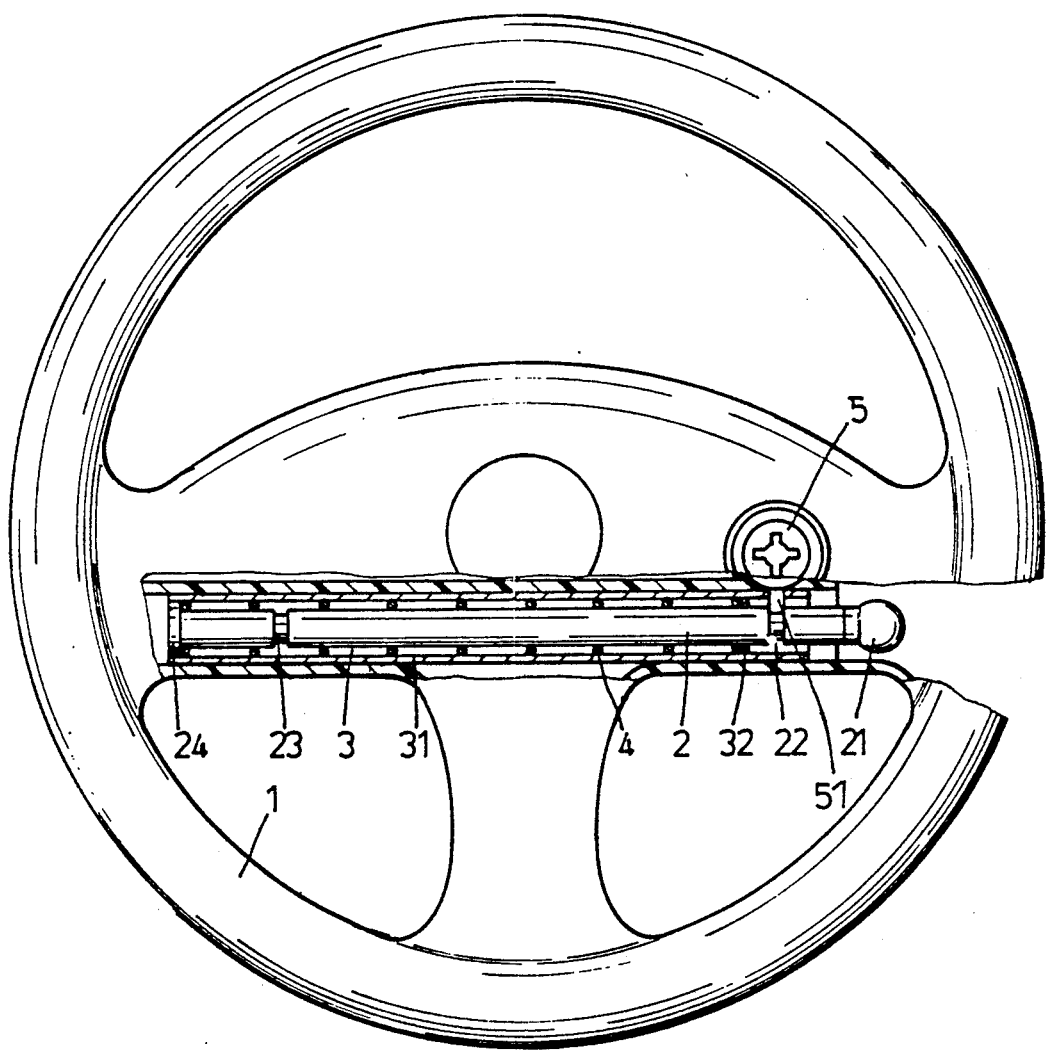
Figure 3B:
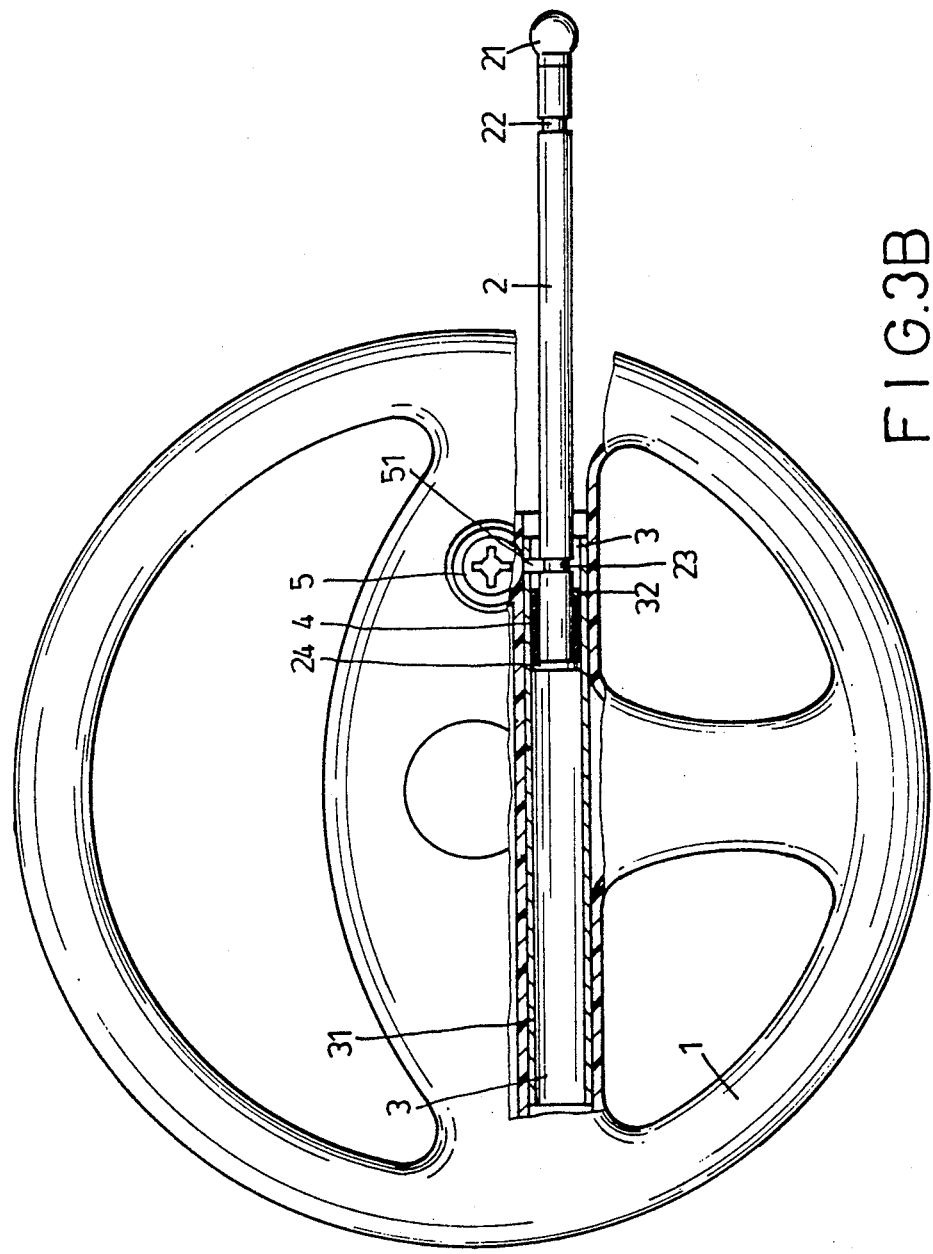
Figure 4A:
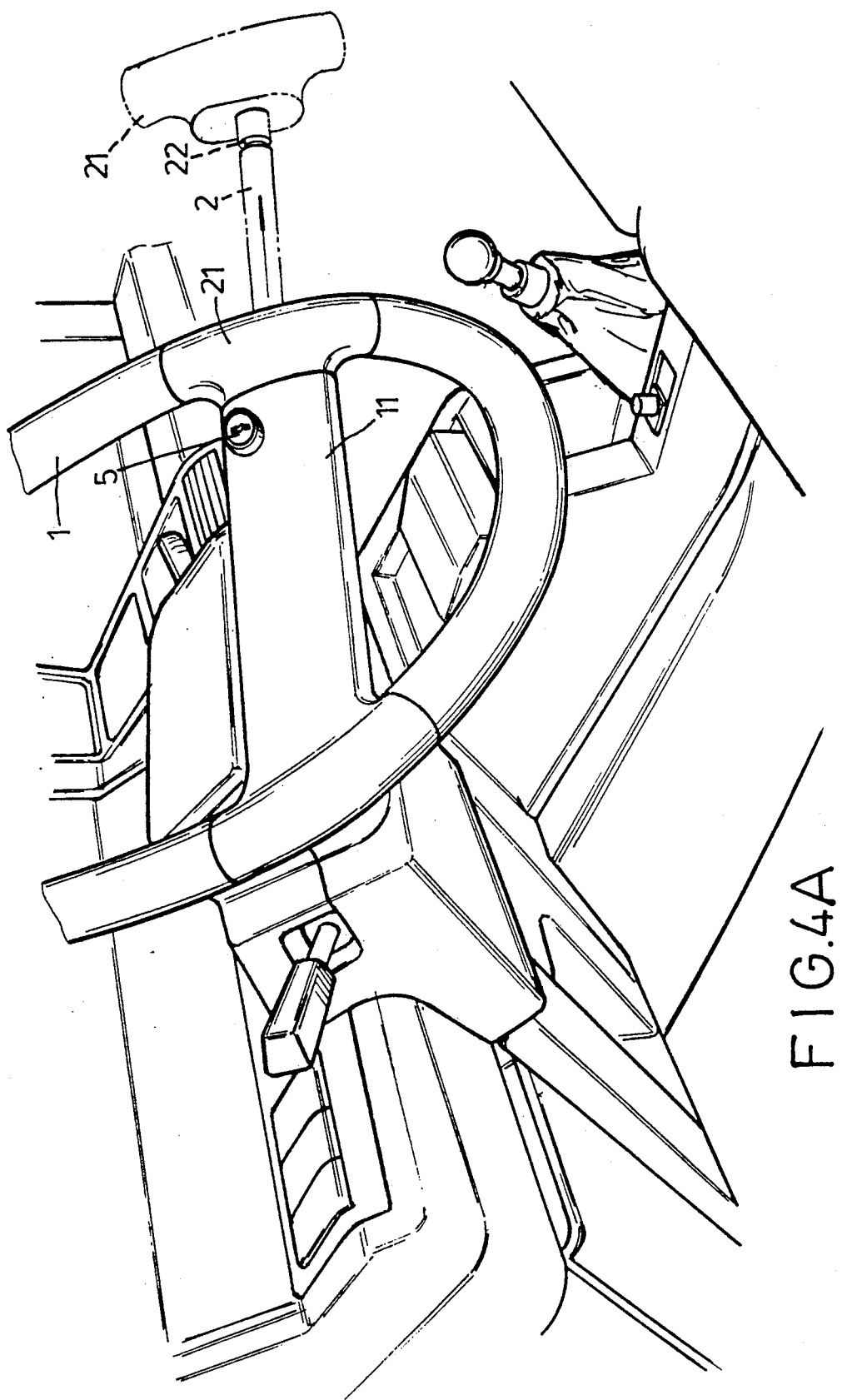
Figure 4B:
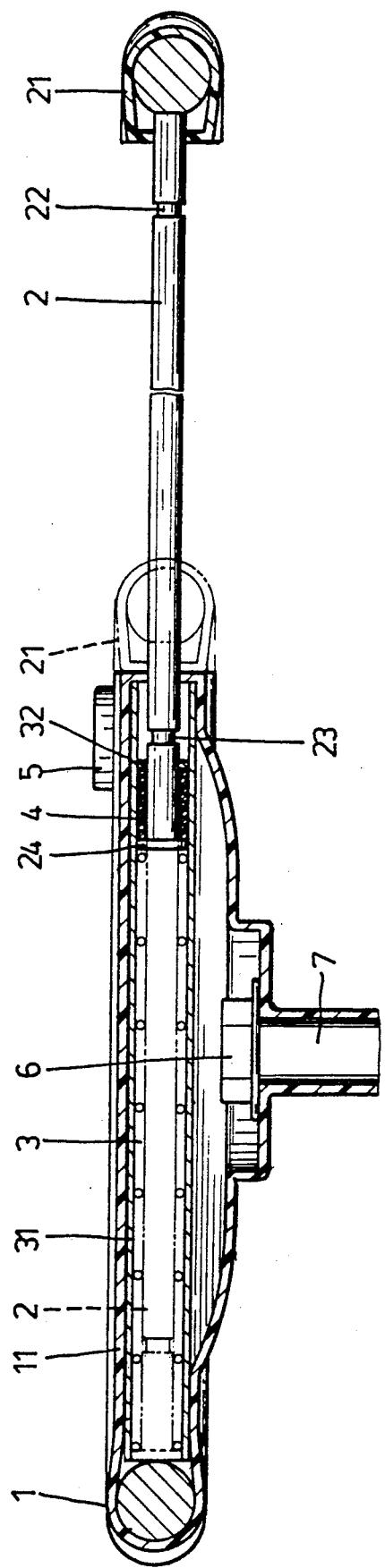
Figure 5:
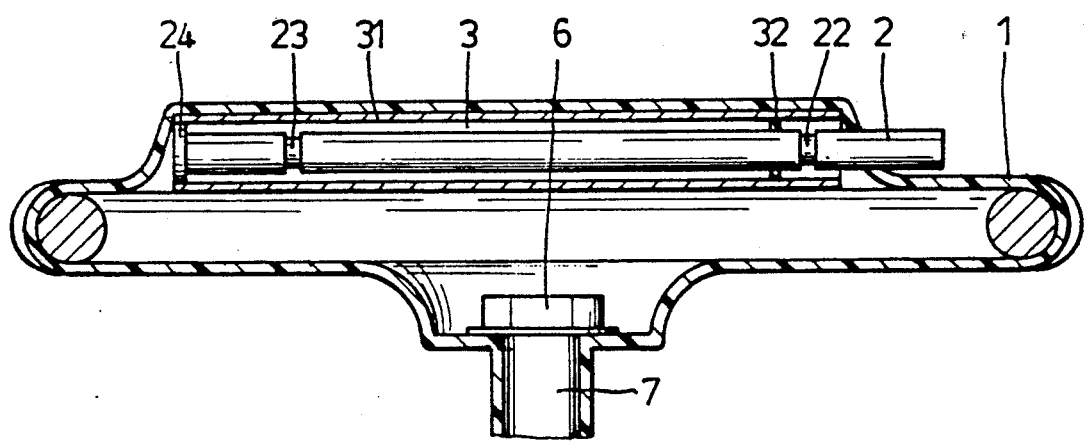
Figure 6:
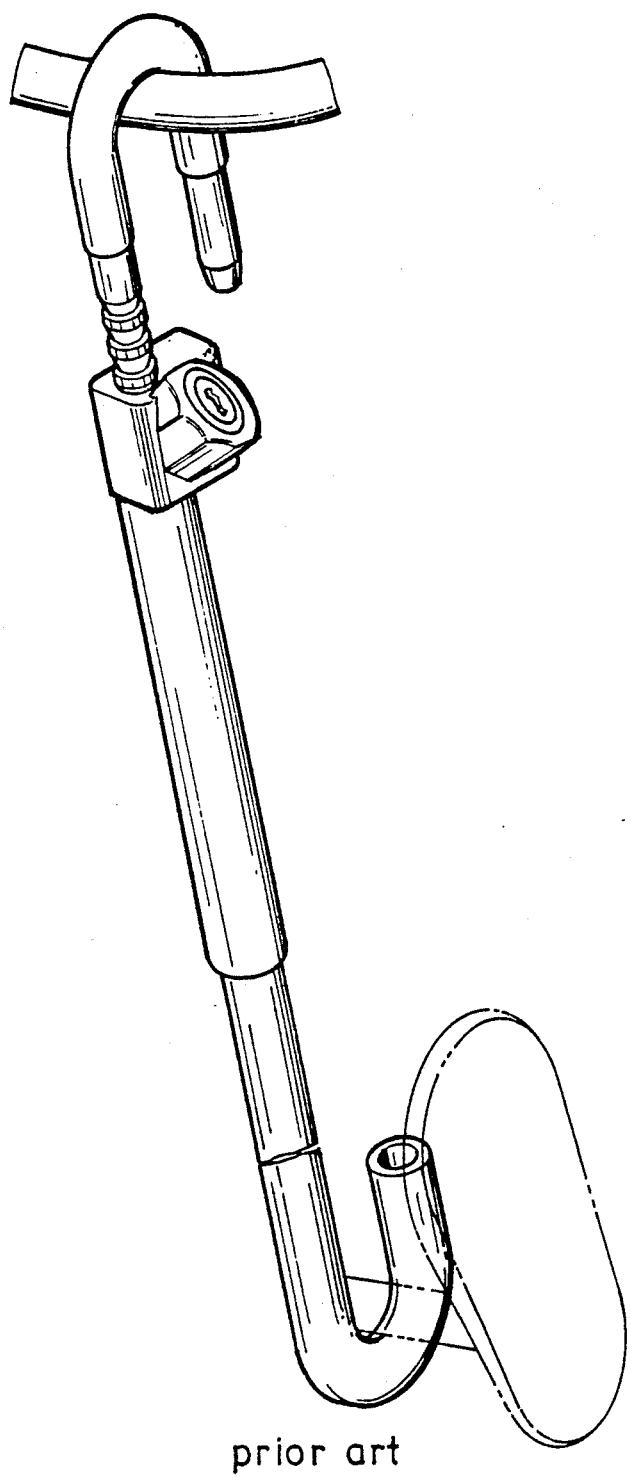
Figure 7:
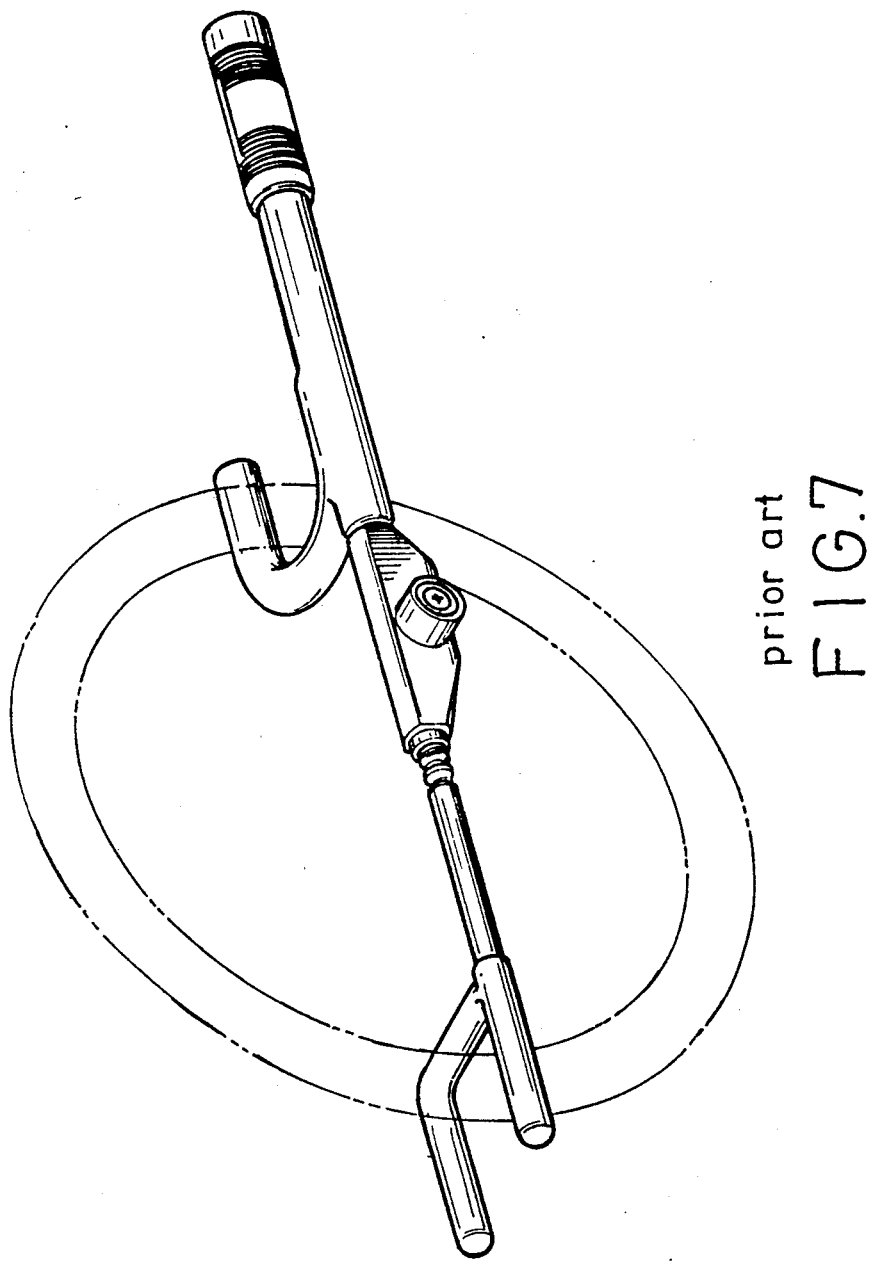

FIG. 1 is a perspective view of the present invention;
FIG. 2 is a cross-sectional view of the present invention;
FIG. 3A is a perspective view of the present invention in retraction position;
FIG. 3B is another perspective view of the present invention in locking position;
FIG. 4A is another perspective view of the present invention;
FIG. 4B is a cross-sectional perspective view of FIG. 4A;
FIG. 5 is a further perspective view of the present invention; and
FIG. 6 and 7 are two perspective views of prior art.

DETAILED DESCRIPTION OF THE PREFERRED EMBODIMENT

Reference is made to the drawings and in particular to FIG. 1 thereof, the present invention includes a cylindric member 2 which is located underneath a rib 11 of the steering wheel 1. FIG. 2 shows details of the invention. Please refer to FIG. 2, the present invention, in particular to one has a trough 3 which is located underneath a rib 11 of the steering wheel 1, and which is shaped like the cylindric member 2 but larger in size. The trough 3 has an opening and has a tube 31 placed inside. The tube 31 is made of either metallic or harden material and has accommodating the cylindric member 2 which is made of solid metallic rod and which has a stop block 24 which is larger in diameter than the cylindric member 2. An extension groove 23 is located near to the stop block 24 end and a storing groove 23 is located close to the other end of the stop block 24 and a lock mechanism 5 is located on the trough 3 and faces the storing groove 23. The lock mechanism 5 has a latch 51 which will stick into either of the grooves 22 and 23 as necessary.

When assemblying, place the cylindric member 2 into the tube 31 of the trough 3, then place the stop block 24 through the top all the way down to the appropriate position and securely connected with the cylindric member 2. Push the cylindric member 2 back into the tube 31 to allow the latch 51 stick into the storing groove 23 and the locking device is now in storage position. When desire to lock the steering wheel, first, unlock the lock mechanism with a legal key then pull the cylindric member 2 outwardly, until the latch 51 stick into the extension groove 23 and the locking device is locked again.

If an authorized driver wishes to use the car, it is simply by insert a legal key inside the keyhole to unlock the lock which at this moment will release the latch 51 from the extension groove 23 and by pushing the cylindric member 2 inside the tube 31 of the trough 3, the lock will be locked again when the latch 51 stick into the storing groove 23. The stop block 24 and the stop shoulder 32 are for blocking purpose to prevent the cylindric member 2 from being pull out and drop off. Furthermore, the trough 3 integrally formed with the steering wheel is basically arranged to be located not direct on the screw 6 of the steering wheel so as not to disturbing the installing procedure.

Please refer to the FIG. 3A and 3B which shows a spring 4 is placed inbetween the stop block 24 and the stop shoulder 32 for the convenience of pushing the cylindric member 2 back into its tube 31 so that driver need only to unlock the lock and the spring 4, because of its elastic force, will pull the cylindric member 2 may also has a knob 21 as for easy handling.

FIGS. 4A and 4B show that the trough 3 may be placed in the rib 11 of the steering wheel 1 which saves space while still performing the same function.

FIG. 5 shows that the trough 3 may be integrally formed on top of the rib 11 of the steering wheel 1.

Viewing the whole descriptions of the present invention, we can realize the good qualities of the invention are as follows:

(1) Reducing the unnecessary procedure of locking and unlocking.

(2) Saving space of storage.

(3) Designing novelty not to disturb the operation.

(4) Simplifying the structure and still have the same function of anti-theft.

I claim:

1. A steering wheel locking device comprising:
   a steering wheel having an integrally formed trough which can accommodate the cylindric member and has an opening at one end and has a securely attached tube; which has a stop shoulder closely to the said opening and has a hole which is larger in size than a cylindric member;
   a cylindric member is a solid metallic rod longer than the said trough and having grooves closed to each end being placed inside of said tube with a knob at one end, two grooves close to each end separately, and a stop block at the other end; said stop block is larger in size than said hole of said stop shoulder;
   a lock mechanism having a locking pin to lock or unlock said grooves of the cylindric member.

2. A steering wheel locking device, claimed as in claim 1, wherein a spring may be placed in between said stop block and said stop shoulder.

3. A steering wheel locking device, claimed as in claim 1, wherein a knob may be formed at one end of said cylindric member.

* * * * *